United States Patent Office 2,893,833
Patented July 7, 1959

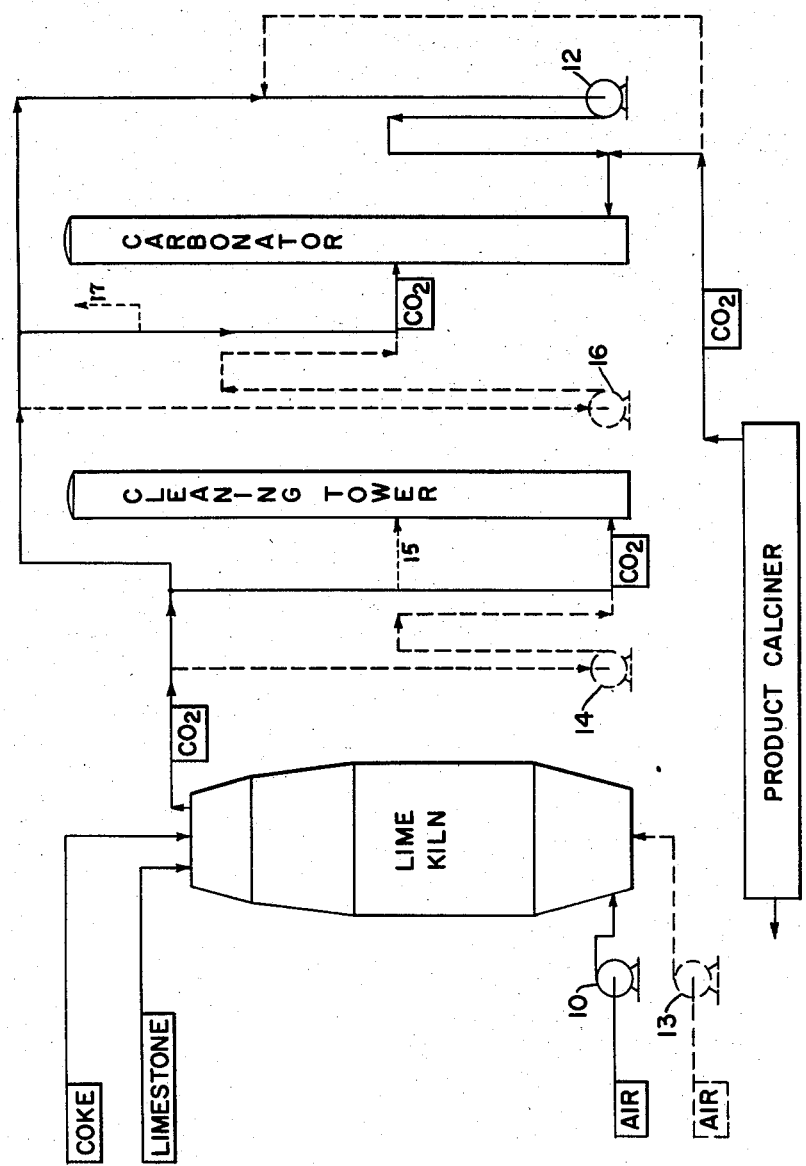

2,893,833

EVOLVING CARBON DIOXIDE UNDER PRESSURE FOR USE IN THE AMMONIA-SODA PROCESS

Zola G. Deutsch, Hackettstown, N.J., assignor to Diamond Alkali Company, Cleveland, Ohio, a corporation of Delaware Application July 26, 1955, Serial No. 524,504

1 Claim. (Cl. 23—65)

This invention relates to improvements in the ammonia-soda process, and more particularly relates to improvements in the operation of kilns and calciners employed in the ammonia-soda process.

In the ammonia-soda process, sodium chloride in the form of brine, together with ammonia and carbon dioxide from a lime kiln, are introduced into one or more towers, carbonators or wet reactors wherein the ammonia and carbon dioxide react to form ammonium bicarbonate, which subsequently reacts with sodium chloride to yield sodium bicarbonate and ammonium chloride. In practice, at least two towers are employed, one being used as the so-called "making" or carbonating tower, while the other is termed the "cleaning" tower, the latter name indicating that the tower is being back-washed with ammoniated brine and carbon dioxide to remove sodium bicarbonate deposits therein.

The product from the carbonator, in the form of a slurry, is filtered to obtain a crude sodium bicarbonate. This crude product is then calcined conventionally to yield sodium carbonate or soda ash and evolve carbon dioxide. Since the efficiency of the ammonia-soda process depends in a large part upon the substantially complete recycling and utilization of byproducts formed, it also is conventional to recycle the carbon dioxide from the calciner during the decomposition of the sodium bicarbonate.

This carbon dioxide is employed in the process either by direct introduction into the carbonator tower or by admixture with carbon dioxide from the lime kiln.

While the ammonia-soda process has been in commercial use for many years and, when properly operated, represents perhaps one of the best examples of an integrated series of chemical processing operations, certain inherent difficulties associated with the process have continued to exist. In prior operation both the lime kiln and calciner have been operated at substantially atmospheric pressure. One of these problems heretofore encountered lies in the requirement of a substantial amount of compressors and related equipment necessary to compress the kiln gas, calciner gas, and/or tower feed gas streams. Such equipment comprises the so-called "engine room" of an ammonia-soda plant and represents a substantial investment and operating expense heretofore considered necessary in the operation of the ammonia-soda process.

It is, therefore, a principal object of the present invention to provide improvements in the ammonia-soda process whereby most, if not all, of the carbon dioxide compressors and associated equipment, heretofore employed in the carbon dioxide generation and flow through the ammonia-soda process, can be eliminated.

A further object of the invention is to provide an improved method of producing alkali metal carbonates.

These and other objects and advantages of the invention will appear more fully from the following description.

This invention broadly comprises the improvement in the ammonia-soda process wherein both the lime kilns and the product calciners are operated at a substantial elevated pressure greater than atmospheric pressure. More particularly, the present invention relates to improvements in the ammonia-soda process whereby an elevated pressure is maintained in both the lime kiln and the product calciner or dryer, thereby to provide carbon dioxide at an elevated pressure available for use in the process with little, if any, further compression required.

The essence of this invention lies in the operation of the lime kilns and the product calciners at a pressure greater than atmospheric, e.g., typically 30 to 60 p.s.i.g.

The elevated pressures at which the kiln and calciner are operated may be the same or different pressures, generally within the range from about 30 to 60 p.s.i.g., 50 p.s.i.g. being preferred at present, to a higher pressure dictated by the practical considerations of equipment design and avoidance of operating difficulties at extremely high pressures. By such operation, substantially all of the gas compressing equipment heretofore employed in the intermediate stages of the ammonia-soda process can be eliminated. The remaining blowers or compressors, if any, can be cheaper to own and operate because of smaller size, lower power consumption, and cleaner gases being handled.

Reference is now made to the accompanying flow diagram in which there is schematically shown the carbon dioxide flow in the ammonia-soda process. As shown by the solid line portion of the flowsheet, air is introduced into a lime kiln by a compressor 10, countercurrent to coke and limestone fed at the top. The effluent carbon dioxide, or kiln gas, containing about 41% carbon dioxide by volume, at an elevated pressure, typically 35–50 pounds per square inch absolute, is then passed to a cleaning tower where it may be introduced, at the bottom and/or at the middle, of the tower via feed pipe 15, or to the carbonator, without intermediate compression. In some instances, it is desirable to provide a reducing valve or vent means, as indicated at 17, in order to insure a predetermined reduced pressure at the point of introduction into the carbonator. In other applications, an intermediate booster compressor, such as is illustrated at 12, may be used, although in most instances it is not necessary. From the product calciner, a second stream of carbon dioxide, about 95% carbon dioxide by volume, at an elevated pressure, is evolved by operating the calciner under pressure in accordance with this invention. This carbon dioxide stream is passed directly to the carbonator, or otherwise consumed, without further compression. In most instances, a kiln gas stream and a product calciner stream are mixed for introduction into the carbonator, or for other consumption in the process. A typical such-mixed gas contains about 68 to 76% $CO_2$.

The broken line portions of the flow diagram substantially indicate the prior art carbon dioxide flow in the ammonia-soda process which has been practiced commercially for many years. In accordance with prior practice, air is passed in to the kiln by a blower 13. The kiln gas, at substantially atmospheric pressure, is then passed to a weak gas compressor 14 and thence to the cleaning tower, or through a second compressor 16 to the carbonator. The calciner exit gas, at substantially atmospheric pressure, is passed through a compressor 12 and thence to the carbonator. The advantages of the present invention, of course, are not only in the elimination of all or a substantial portion of the compressor equipment heretofore considered an essential part of an ammonia-soda plant but also in the power savings realized.

In order that those skilled in the art may more completely understand the present invention and the preferred methods by which the same may be carried into effect, the following specific examples are offered which illustrate operation in accordance with this invention utilizing two feed streams of carbon dioxide to the cleaning tower:

Example I

Considering the process indicated by the schematic flow diagram on the basis of power consumption per ton of salable soda ash, the prior practice, under efficient conditions, employs a first blower 13 of 25,000 cu. ft. capacity supplying air to the lime kiln at ±½ p.s.i.g. and consuming 0.24 kw.h.

The kiln gas then is passed through a weak gas compressor 14 which raises its pressure to about 34 p.s.i.g. and consumes 12.1 kw.h. A second portion of the kiln gas is passed through another compressor 16, which raises its pressure to 26 p.s.i.g. and requires 25.5 kw.h., while still a third portion of the kiln gas is mixed with the dryer or calciner gas and passed to the carbonator through a third compressor 12, which raises its pressure to 48 p.s.i.g. and requires 35.7 kw.h. It will thus be seen that the total power consumption in this typical prior operation is 73.54 kw.h.

On the other hand, employing the practice of the present invention, the same volume, i.e., 25,000 cu. feet of air, is introduced to the lime kiln by a first compressor 10, which initially raises its pressure to 27 p.s.i.g. and consumes 35.5 kw.h. The kiln gas, now at a pressure of 24 p.s.i.g., is passed directly to the cleaning tower and/or to the carbonator without intermediate compression. A portion of the kiln gas, together with the dryer, or calciner exit gas, is further compressed to 48 p.s.i.g. in a compressor requiring but 5.5 kw.h. Thus, the total power requirement in accordance with the present invention is 41 kw.h., or but 56% of the comparable prior power requirements.

Example II

Comparable figures reflecting the improvement in power consumption obtained in the practice of the present invention contrasting prior operation on a somewhat different carbonation cycle wherein both the kiln and product drier or calciner are maintained at atmospheric pressure, together with systems wherein the kiln alone is pressurized, the calciner alone is pressurized, and both the calciner and kiln are pressurized in accordance with the present invention, are as follows. Operating the kiln and calciner at atmospheric pressures, the total power demand for the kiln air blower, weak gas compressor, and strong gas compressor is 55.82 kw.h. The corresponding figure when the kiln alone is pressurized is 48.22 kw.h., while operation with the calciner pressurized with the kiln at atmospheric pressure requires 38.66 kw.h.

Operating the process in accordance with the present invention, the total power demand is but 33.03 kw.h., this power being consumed by an air blower which supplies the lime kiln with air at a pressure of 36.5 p.s.i.g. and a weak gas booster which raises the pressure of the kiln gas from 35.7 to 56.7 p.s.i.g. Hence, a saving of 59% in power consumption over conventional operation is realized.

While the invention thus far has been described with particular reference to the production of soda ash in the ammonia-soda process, those skilled in the art will recognize that the principle of the invention also is applicable to the production of other alkali metal carbonates and bicarbonates wherein calcining and drying operations to evolve a re-cyclable gas constituent are involved. The expression "alkali metal," as used in the specification and claims, is, of course, intended to include the various alkali metals, e.g., sodium, potassium, lithium, cesium, and rubidium, although it is recognized that sodium and potassium comprise the most readily available and most widely used elements of the alkali metal class.

The apparatus employed in the practice of the present invention may comprise various types of equipment and the apparatus per se forms no part of the present invention.

It is to be understood that although the invention has been described with specific reference to particular embodiments thereof, it is not to be so limited, since changes and alterations therein may be made which are within the full intended scope of this invention as defined by the appended claim.

What is claimed is:

In the ammonia-soda process wherein carbon dioxide is introduced into ammoniated sodium chloride brine in a carbonating tower to form sodium bicarbonate which is subsequently calcined to form sodium carbonate and carbon dioxide, and limestone is calcined with air and coke to form lime and carbon dioxide, and the carbon dioxide evolved from both of the calcined products is then subjected to step-wise compression and introduced into said carbonating tower, the improvement which includes separately calcining both said sodium bicarbonate and said limestone at a pressure of at least 30 p.s.i. (gauge), and introducing the evolved carbon dioxide into said carbonating tower at a substantially elevated pressure above atmospheric pressure afforded by the pressure of the calcination of both said bicarbonate and said limestone, whereby the intermediate step-wise compression of said carbon dioxide from the calcination of said bicarbonate and said limestone introduced into said carbonating tower is substantially eliminated, and power requirements for compressing said carbon dioxide are substantially reduced.

References Cited in the file of this patent

UNITED STATES PATENTS

| | | |
|---|---|---|
| 263,310 | Browne | Aug. 29, 1882 |
| 1,570,299 | Galt | Jan. 19, 1926 |
| 1,611,401 | Arnold | Dec. 21, 1926 |
| 1,862,900 | Lynn et al. | June 14, 1932 |
| 1,894,766 | Harrison | Jan. 17, 1933 |
| 2,189,826 | Windecker et al. | Feb. 23, 1940 |

OTHER REFERENCES

Manufacture of Soda, Hou, T. P., Reinhold Publishing Corp., 1942, second edition, page 220.